United States Patent
Schreuder et al.

(10) Patent No.: US 7,248,875 B2
(45) Date of Patent: Jul. 24, 2007

(54) METHOD AND SYSTEM TO OPTIMISE SOFT HANDOVER GAIN IN NETWORKS

(75) Inventors: Harmen Schreuder, Spring Grove (SG); Theodore Buot, Spanish Village (SG); Houtao Zhu, Yokohama (JP)

(73) Assignee: Nokia Corporation, Espoo (FI)

( * ) Notice: Subject to any disclaimer, the term of this patent is extended or adjusted under 35 U.S.C. 154(b) by 686 days.

(21) Appl. No.: 10/465,793

(22) Filed: Jun. 20, 2003

(65) Prior Publication Data
US 2004/0058681 A1    Mar. 25, 2004

(51) Int. Cl.
H04Q 7/20    (2006.01)
(52) U.S. Cl. ............... 455/442; 455/436; 455/443
(58) Field of Classification Search ........... 455/436, 455/437, 438, 439, 440, 441, 442, 443, 444
See application file for complete search history.

(56) References Cited

U.S. PATENT DOCUMENTS

| | | | |
|---|---|---|---|
| 5,732,328 | A | 3/1998 | Mitra et al. |
| 6,097,956 | A | 8/2000 | Veeravalli et al. |
| 6,658,252 | B2* | 12/2003 | Mohebbi ............ 455/437 |
| 7,103,361 | B2* | 9/2006 | Gustafsson ......... 455/446 |
| 2002/0077141 | A1* | 6/2002 | Hwang et al. ........ 455/522 |
| 2002/0198000 | A1* | 12/2002 | Voyer ................. 455/453 |
| 2005/0059401 | A1* | 3/2005 | Chen et al. ......... 455/437 |

FOREIGN PATENT DOCUMENTS

| | | |
|---|---|---|
| EP | 0936753 | 8/1999 |
| EP | 1098546 | 5/2001 |
| WO | 98/59433 | 12/1998 |
| WO | 02/41658 | 5/2000 |
| WO | 00/38456 | 6/2000 |
| WO | 02/41658 | 5/2002 |

OTHER PUBLICATIONS

Nagate et al., "An Integrated Approach for Performance Modeling and Evaluation of Soft Handoff in CDMA Mobile Cellular Systems," Vehicular Technology Conference Fall 2000.

* cited by examiner

*Primary Examiner*—Creighton H Smith
(74) *Attorney, Agent, or Firm*—Squire, Sanders & Dempsey L.L.P.

(57) ABSTRACT

The invention provides a method, system, and network entity for improving Soft Handover (SHO) Gain in networks, preferably in CDMA networks, comprising the step of determining the network performance in the UL (uplink) or in the DL (downlink), or both in the UL (uplink) and in the DL (downlink), and of measuring and tuning at least one or more of those parameters, preferably system outputs, that are directly related to SHO Gain, so as to control, preferably maximise, SHO Gain. The determination of the network performance provides an indicator of when and where SHO Gains are needed. The invention can be implemented in the RNC and/or BS and can e.g. be part of RAN, e.g. an UTRAN solution as well as IP RAN.

31 Claims, 4 Drawing Sheets

DL in Soft Handover

SHO Gains after Combining the Multipath Components

SHO Fast Fading Gains with Tx and Rx Power Difference

Outage Probability vs. Fast Fading Margins
With and Without SHO

METHOD AND SYSTEM TO OPTIMISE SOFT HANDOVER GAIN IN NETWORKS

FIELD AND BACKGROUND OF THE INVENTION

The invention generally relates to a method and system to optimise soft handover gain in networks such as CDMA (Code Division Multiple Access) networks, or wideband code division multiple access (WCDMA) systems such as the universal mobile telecommunication system (UMTS).

In CDMA Radio Access Network Optimisation several methods are used for tuning the network performance. Soft Handover is one of the important optimisation areas because it has significant influence on system quality, capacity and coverage. Soft Handover may provide, for uplink, Rx diversity, separate decoding at each NodeB, selection combining at RNC (based on frame reliability indicator), and for downlink, double signal power, double interference, improved fading statistics. Different DL power control commands are possible, or a combination of soft values.

Soft-handover (SHO) means that a user equipment (UE) may be connected to two or more base stations (BS) when moving from one cell to another. In general, application of SHO makes it possible to have seamless (transparent) handover and improved coverage. However, SHO requires a higher average transmit power level from BS's in the network, also know as the SHO overhead. The SHO overhead is in general a function of the handover parameters $Window_{13}$ Add and $Window_{13}$ Drop.

For optimising the Soft Handover (SHO) usually a parameter "Soft Handover (SHO) Overhead" is measured and tuned. This value is easy to measure. The metric, i.e. measured value of "SHO Overhead" is tuned to a (arbitrary) specific target value. This target value is determined based on uniform traffic distributions and provides decent network performance for such cases. The target for the "SHO Overhead" in the tuning is also often set to a value which is acceptable in terms of the allowed capacity for the backbone network, e.g. BTS-RNC (Base Transceiver Station, Radio Network Controller) links. The importance of the "Soft Handover Overhead" metric is to make sure that the overhead in terms of the number of connections per cell is not excessive.

SUMMARY OF THE INVENTION

It is an object of the present invention to provide for optimising Soft Handover Gain in networks.

According to the present invention this object is achieved by a method according to any one of the method claims and/or a system according to any one of the system claims.

The invention provides a system and method for optimising Soft Handover Gain in networks, preferably in CDMA networks.

The invention provides, as some of the advantages, improved system performance and capacity.

The invention defines a method to optimise (maximise) the Soft Handover Gain preferably in the radio link, in particular downlink.

Instead of tuning the "SHO Overhead" to a certain target value, the SHO Gain is increased or maximised by measuring and tuning at least one or more of those system outputs that are directly related to SHO Gain. Contrary thereto, the metric "Soft Handover Overhead" is not directly related to the gains of the Soft Handover, and accordingly non-optimal.

By means of concentrating directly to the SHO Gain, the output network will have more optimal performance. The system performance and capacity are improved.

According to one of the aspects of the invention, there is provided a method for improving Soft Handover (SHO) Gain in networks, preferably in CDMA networks, comprising the step of determining the network performance in the UL (uplink) or in the DL (downlink), or both in the UL (uplink) and in the DL (downlink), and of measuring and tuning at least one or more of those parameters, preferably system outputs, that are directly related to SHO Gain, so as to control, preferably maximise, SHO Gain.

The method can be applied to network clusters individually which means that each location is optimized based on their inherent traffic characteristics.

According to another one of the aspects of the invention, there is provided a system for improving Soft Handover (SHO) Gain in networks, preferably in CDMA networks, comprising means for determining the network performance in the UL (uplink) or in the DL (downlink), or both in the UL (uplink) and in the DL (downlink), and means for measuring and/or tuning at least one or more of those parameters, preferably system outputs, that are directly related to SHO Gain, so as to control, preferably maximise, SHO Gain.

Further features and advantages of the present invention are disclosed in the following decription, or are evident from the drawings.

BRIEF DESCRIPTION OF PREFERRED EMBODIMENTS OF THE INVENTION

Figure 1:
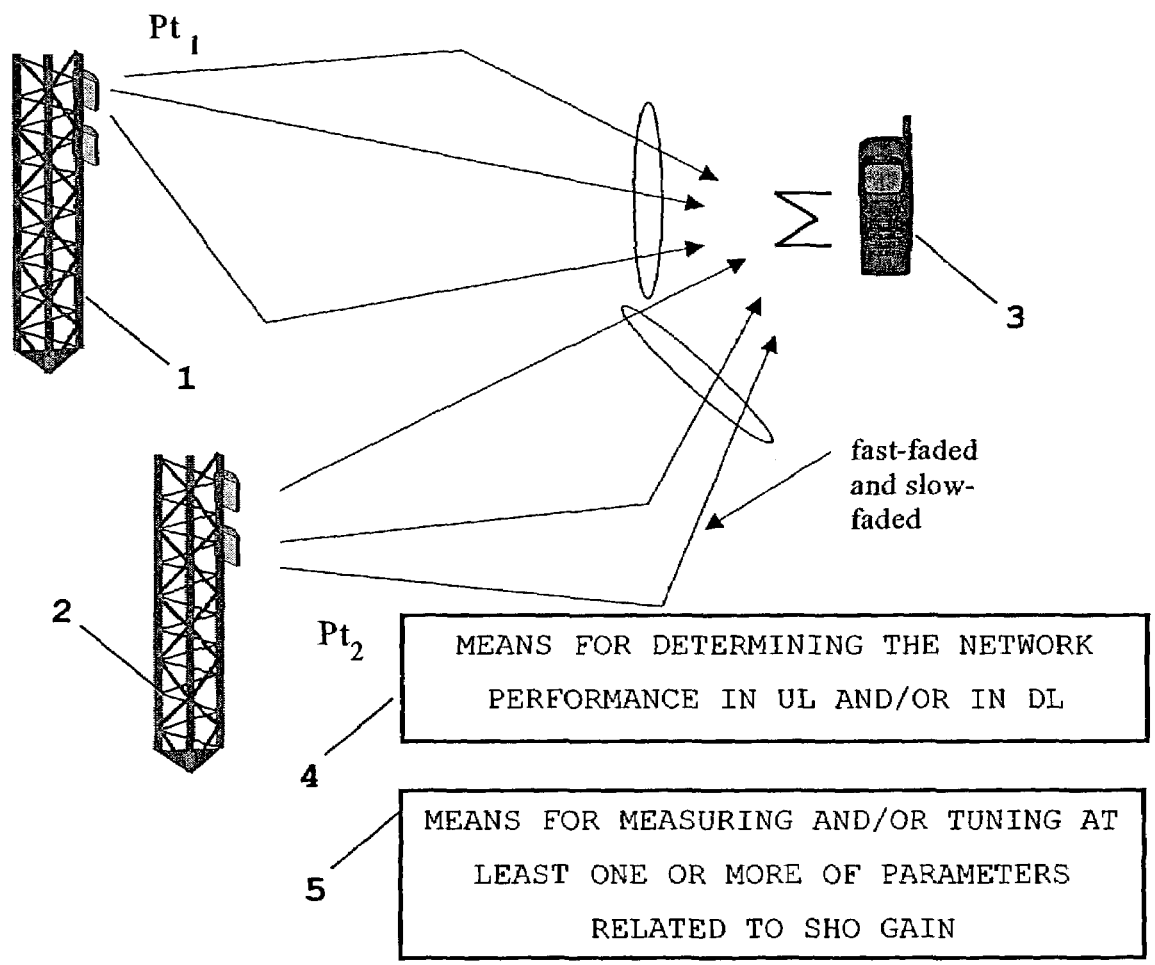
FIG. 1 shows a schematic block diagram illustrating downlink (DL) in Soft Handover in an embodiment of the present invention.

This invention defines a method and system to optimise (maximise) the Soft Handover (SHO) Gain in the radio link, e.g. downlink. Instead of tuning the "SHO Overhead" to a certain target value, the SHO Gain is maximised by tuning the system outputs that are directly related to SHO Gain.

The gain is important especially in the downlink (DL) since it can help in increasing the capacity. Moreover, Soft Handover in the downlink can result in a capacity loss instead of a capacity gain if the soft handover performance is not constantly monitored.

The invention provides more optimal network performance and capacity, compared to traditional methods.

By means of concentrating directly on the SHO Gain, the output network will have more optimal performance. The method can be applied to network clusters individually. Each location can thus be optimized based on their inherent traffic characteristics.

A first step towards the optimization is to determine the network performance both in the UL (uplink) and in the DL (downlink). This determination will provide an indicator of when and where SHO Gains are needed. For example, in the coverage-limited environment (which is UL limited), higher SHO Gain in the UL is desirable in order to reduce the UL outage probability. For capacity-limited cases (i.e. DL limited), SHO Gains in the DL are desirable to reduce the congestion probability (i.e. blocking or queuing).

In the following, a Coverage-Limited (Uplink) Case will be discussed:

If the network is coverage limited, the method preferably starts with the UL optimization. In a coverage-limited case, the UL and DL loads are below the load targets. This means, there is an excess capacity in terms of the number of codes and loading to support more links in both the UL and DL. The UL optimization usually involves an adjustment in the SHO parameters which e.g. are the parameters a) SHO Window_Add, 2) Window_Drop, and 3) activeSetSize. When the pathloss difference measured from a UE (User Equipment) towards two different Base Stations is less than Window_Add, then the UE enters SHO mode. Similarly, when the pathloss difference becomes larger than Window_Drop, the UE exit SHO mode. Hence, these parameters influence the percentage of users in SHO mode, and therefore also the degree of SHO overhead. In the UL, it is often the case that higher SHO Gains correspond to a higher "SHO Overhead". The effects of a higher SHO in the UL for coverage-limited cases is that the bearer's link budget improves due to the diversity effect of having more branches (e.g. macro-diversity). Therefore, the UL becomes more immune to fast fading. In other words, the fast fading margin required can be lowered.

The performance indicator to be monitored is the UL outage probability. At the same time, the NoiseRisePerUser can also be monitored since higher SHO Gain usually lowers the target EbNo (EbNo is the energy per bit to noise density ratio) of the bearers. The DL performance has to be monitored as well since the best "SHO Overhead" usually differs between the UL and the DL.

In the following, a Capacity-Limited (Downlink) Case will be discussed:

In a capacity-limited case, the downlink power reaches the target. In this case, one can use the SHO Gain to reduce the power. If the average power per bearer or per user decreases by adjusting the SHO parameters, then there exists a set of parameter setting that correspond to a minimum BS power. Note again that in a capacity-limited case, the UL has enough margins for capacity and coverage.

Usually, the SHO Gain in the DL due to fast fading is high if the connections in the active set have comparable pathlosses. This requires lower SHO windows. In addition, the slowfading gain increases if the SHO windows are higher. So the adjustment in the SHO windows requires careful observation of the performance metrics (see next pharagraph). If the network is able to lower the BTS (BTS meaning Base station or Node B) power, then more users can be admitted to the network.

Indicators for UL and DL Performance:

Instead of tuning "SHO Overhead" to a certain target value, the SHO Gain is preferably maximised by tuning system outputs that are directly related to SHO Gain.

Measurements and tuning criteria possibilities are (one of these metrics or a combination of two or more of these metrics can be used):

Power/normalised user:

$$\frac{\sum \hat{P}txTotal}{N_{norm}},$$

where $\Sigma \hat{P}txTotal$ is the sum of the transmission powers of the BTSs in the cluster and $N_{norm}$ is the total normalised number of users in the cluster: $N_{norm}=N_j \cdot (R_j/R_0 \cdot E_b N_{0,j}/E_b N_0)$, where $N_j$ is the number of users for type j traffic, $R_0$ is the reference bitrate, $R_j$ is the bitrate for type j, $E_b N_0$ is the reference EbNo target and $E_b N_{0,j}$ is the target for type j.

NoiseRise/normalised user:

$$\frac{\sum NR}{N_{norm}},$$

where $\Sigma NR$ is the sum of the noise rises of the cells in the cluster and $N_{norm}$ is the total normalised number of users in the cluster.

LF (Load Factor)/normalised user (for UL and DL separately):

$$\frac{\sum LF}{N_{norm}},$$

where LF is the sum of the load factors of the cells in the cluster and $N_{norm}$ is the total normalised number of users in the cluster.

QoS (Quality of Service) in terms of:
  Call Block Ratio or Blocking probability
  Packet queuing probability
  Call Drop Ratio.

In the first stage it is likely that all the BTSs in a cluster have the same parameter setting. However, in later stages, due to automatic tuning BTS parameters can be tuned individually.

An example of a best mode of implementation of the invention, i.e. a procedure to optimise the SHO Gain, in case the DL is the limiting link, is as follows:

(1) The "SHO Overhead" is decreased stepwise. Key performance indicators (KPIs), indicating the Soft Handover Gain, have to be monitored.
(2) As long as link performance is improved, the key performance indicators will improve.
(3) Continue until the KPIs can not be improved further, then the optimisation is completed.

FIG. 1 illustrates the DL in Soft Handover and shows that the combined signal at a terminal (Mobile Station) 3 is the sum ($\Sigma$) of the multipath components of two base stations 1, 2 in SHO. The transmitted power Pt1, Pt2 of the base stations 1, 2 can be slow faded or fast faded, as illustrated by the lines in FIG. 1.

The system includes a means 4 for determining the network performance in UL and/or in DL, and a means 5 for measuring and/or tuning at least one or more of parameters related to SHO gain. The means 4, 5 may be provided in each base station or in the radio network controller, or in another appropriate location allowing network performance determination, and/or measuring and/or tuning at least one or more of parameters related to SHO gain.

Basically all functionality, e.g. the measurement and tuning, can be located in the NMS (network monitoring system). Here is all data collected in the network collected and analysed. From the NMS it is also possible to tune the parameters in the network elements (RNC, Node B). The NMS in this case represents the measurement and tuning devices.

Figure 5:
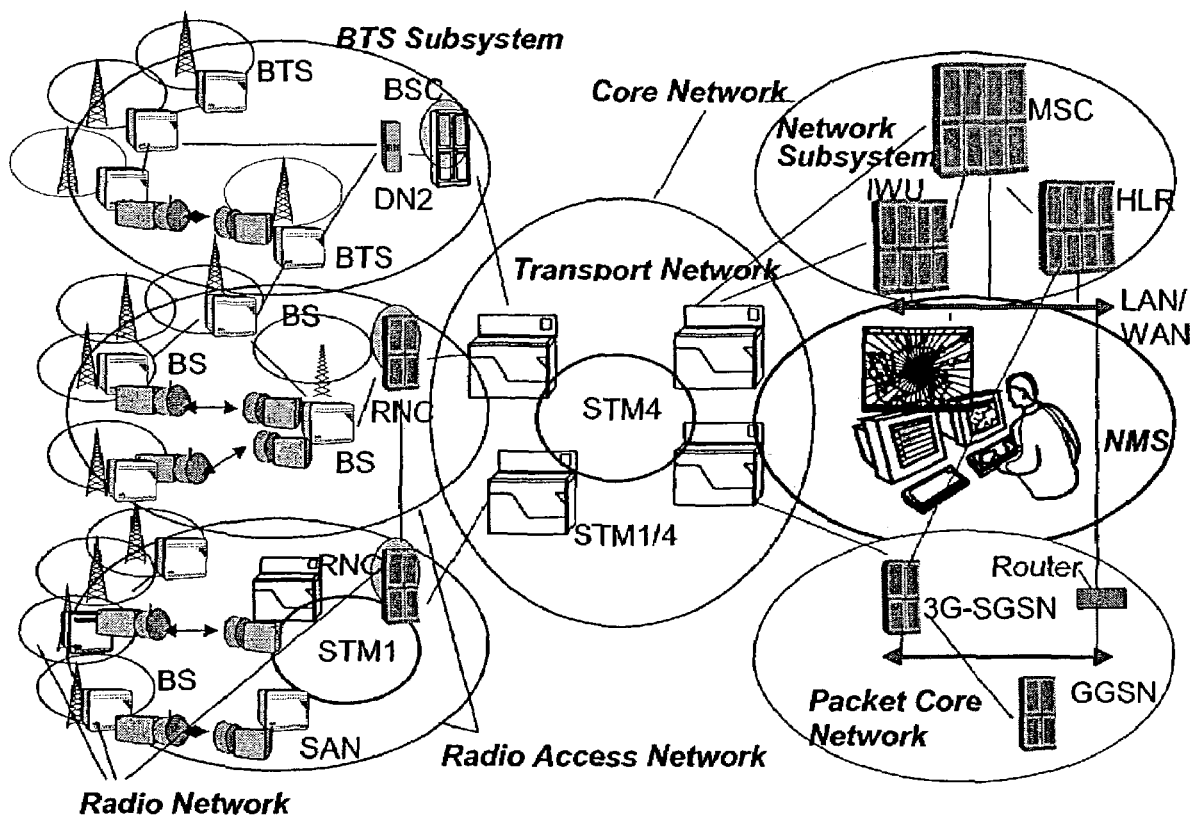
FIG. 5 shows a schematic block diagram illustrating a basic structure of an embodiment of the present invention.

FIG. 5 shows a schematic block diagram illustrating a basic structure of an embodiment of the present invention which comprises an NMS. The network system shown in FIG. 5 additionally provides a basic network architecture which comprises one or more radio (access) networks of the same or different kinds, one or more BTS subsystems, one or more core networks forming the transport network(s), one or more network subsystems, and one or more packet core networks. The NMS is monitoring the networks and may tune the network depending on parameters such as load, delay etc, as necessary.

Figure 2:
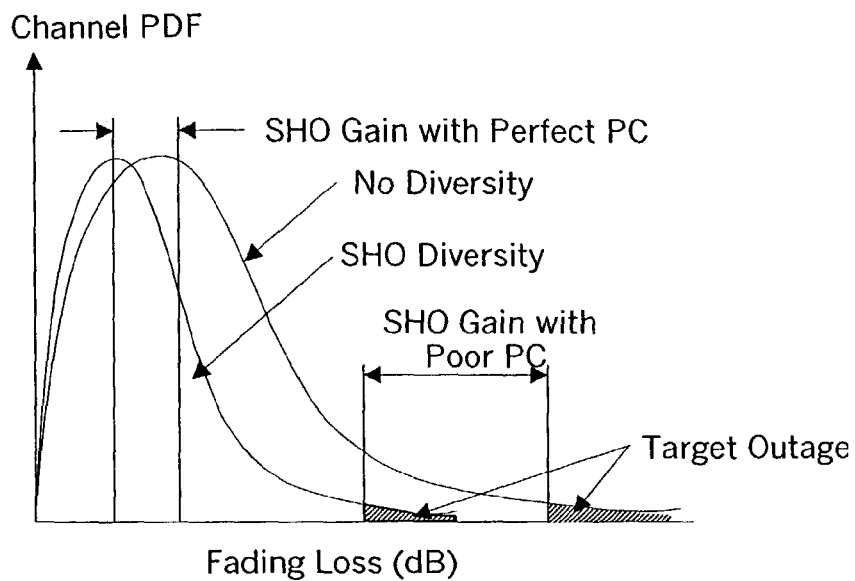
FIG. 2 illustrates an example of SHO Gains after Combining the Multipath Components, in an embodiment of the invention.

The vertical axis of FIG. 2 represents the Channel PDF. The horizontal axis of FIG. 2 represents Fading Loss (dB). FIG. 2 shows SHO Gains after Combining the Multipath Components, and illustrates that SHO Gain is dependent on the Power Control (PC) Efficiency. The distance between the peaks of the curves "SHO Diversity" and "No Diversity" represents the value "SHO Gain with Perfect PC" (PC=Power Control), and is illustrated by arrows in FIG. 2. Further, FIG. 2 shows "SHO Gain with Poor PC" between the both cases "SHO Diversity" and "No Diversity". The hatched areas of the curves represent target outage for the both cases "SHO Diversity" and "No Diversity".

The SHO gain for coverage-limited case is in the reduction of the outage probability while the SHO gain for capacity limited case is in the reduction in the average transmitted power. The other gain is due to the slow fading.

Figure 3:
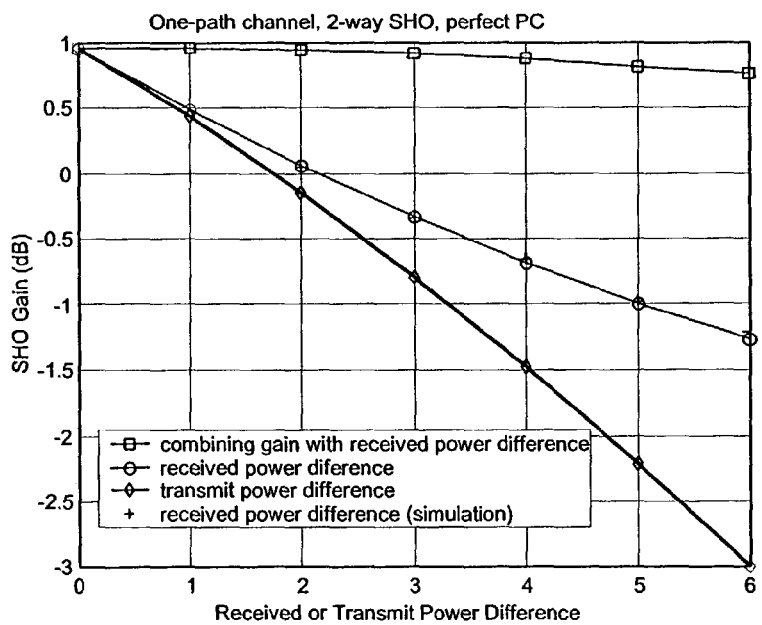
FIG. 3 shows another example of SHO Fast Fading Gains with Tx and Rx Power Difference, in an embodiment of the invention.

FIG. 3 illustrates SHO Fast Fading Gains with Tx and Rx Power Difference. FIG. 3 is based on a one-path channel. The gains are in dBs. The vertical axis of the table of FIG. 3 represents "SHO Gain (dB)" whereas the horizontal axis represents "Received or Transmit Power Difference (dB)". The curves are shown for the case of "One-path channel, 2-way SHO, perfect PC". The upper curve including squares represents "Combining gain with received power difference". The curve having circles represents "Received power diference". The crosses represent values of "Received power difference" obtained by simulation which partially coincide with the circles obtained by measuring. The lowest curve including rhombuses represents "Transmit power difference".

The Tx and Rx power difference is proportional to the SHO windows.

Figure 4:
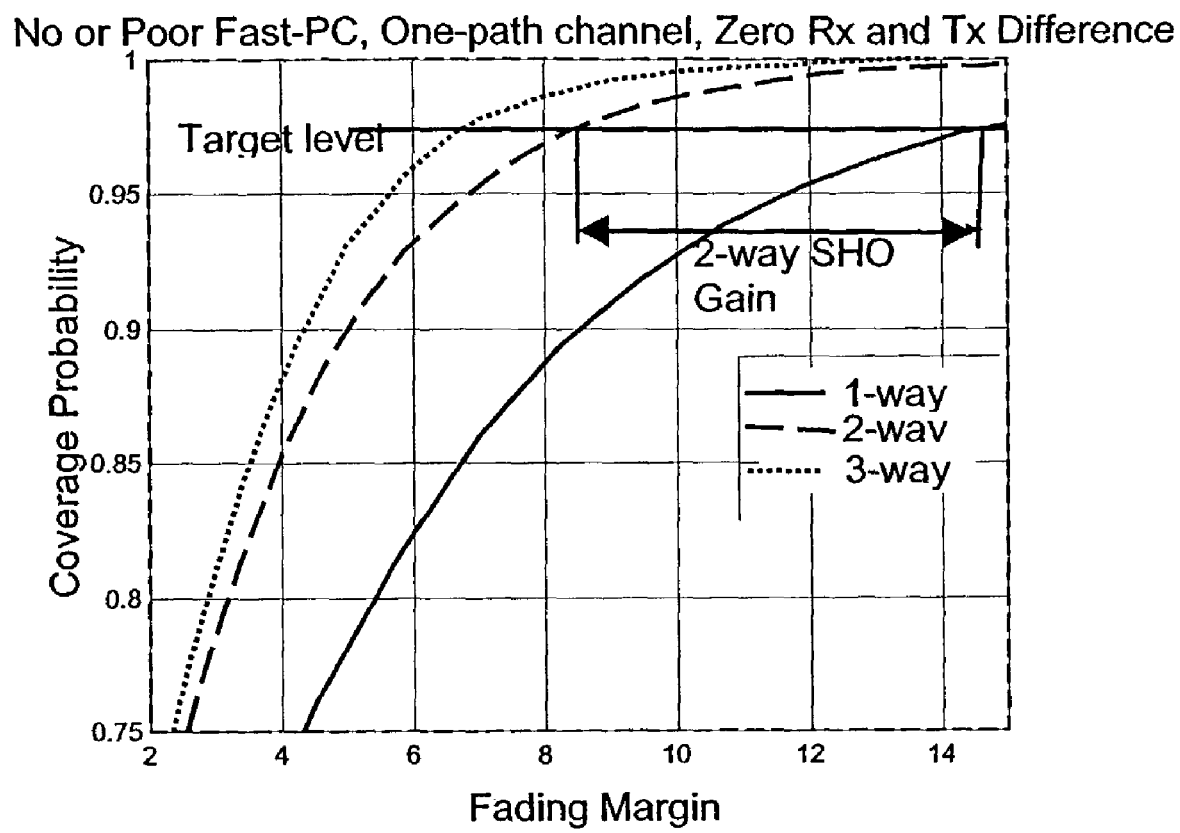
FIG. 4 illustrates further examples of Outage Probability vs. Fast Fading Margins With and Without SHO, in an embodiment of the invention.

FIG. 4 illustrates a case with "No or Poor Fast-PC, One-path channel, Zero Rx and Tx Difference". The horizontal axis of the table of FIG. 4 illustrates "Coverage Probability" whereas the horizontal axis represents the "Fading Margin". The curve drawn as a solid line represents the case of 1-way SHO. The curve drawn as dashed line represents the case of 2-way SHO. The curve drawn in dotted line represents the case of 3-way SHO. The horizontal line illustrates a target level. The arrowed line represents the achieved "2-way SHO Gain" corresponding to the difference between the crossing points between the solid line and dashed line, on the one hand, and the target level line, on the other hand.

FIG. 4 shows the Outage Probability versus Fast Fading Margins With and Without SHO. FIG. 4 shows that the DL outage probability can be greatly reduced for a given fading margin (in dB). This reduction shows that the coverage can be improved if not the capacity.

While the invention has been described with reference to preferred embodiments, the description is illustrative of the invention and is not to be construed as limiting the invention. Various modifications and applications may occur to those skilled in the art without departing from the scope of the invention as e.g. defined by the appended claims.

The invention claimed is:

1. A method for improving soft handover Gain, comprising:
   determining the network performance in the uplink or in the downlink, or both in the uplink and in the downlink; and
   measuring and tuning at least one or more of those parameters that are directly related to soft handover Gain, so as to control soft handover Gain,
   wherein, if the network is coverage limited, the method starts with adjusting soft handover parameters,
   wherein the soft handover parameters are 1) soft handover windowAdd, 2) windowDrop, and 3) activeSetSize.

2. The method of claim 1, wherein determining the network performance provides an indicator of when and where soft handover Gains are needed.

3. The method of claim 1, wherein, in a coverage-limited environment, higher soft handover Gain is provided in the uplink in order to reduce the uplink outage probability.

4. The method of claim 1, wherein, for capacity-limited cases, soft handover Gains in the downlink are increased to reduce congestion probability.

5. The method of claim 1, wherein the networks are CDMA networks.

6. The method of claim 1, wherein the parameters are system outputs.

7. The method of claim 1, wherein, for determining the network performance, at least one of one or more of performance indicators, uplink outage probability or NoiseRisePerUser are monitored.

8. The method of claim 1, wherein downlink performance is monitored as well, the soft handover Gain is controlled so as to reduce the power of the downlink.

9. A method for improving soft handover Gain, comprising:
   determining the network performance in the uplink or in the downlink, or both in the uplink and in the downlink; and
   measuring and tuning at least one or more of those parameters that are directly related to soft handover Gain, so as to control soft handover Gain,
   wherein, for determining the network performance in the uplink or in the downlink, or both in the uplink and in the downlink, at least one or more of the following parameters is measured, tuned or both measured and tuned:
   Power/normalized user:

$$\frac{\sum \hat{P}txTotal}{N_{norm}},$$

where $\Sigma \hat{P}txTotal$ is the sum of the transmission powers of the base transceiver stations in the cluster and $N_{norm}$ is the total normalized number of users in the cluster: $N_{norm}=N_j$.

$(R_j/R_0 \cdot E_bN_{0,j}/E_bN_0)$, where $N_j$ is the number of users for type j traffic, $R_0$ is the reference bitrate, $R_j$ is the bitrate for type j, $E_bN_0$ is the reference EbNo target and $E_bN_{0,j}$ is the target for type j;

NoiseRise/normalized user:

$$\frac{\sum NR}{N_{norm}},$$

where $\Sigma NR$ is the sum of the noise rises of the cells in the cluster and $N_{norm}$ is the total normalized number of users in the cluster;

load factor/normalized user (for unlink and downlink separately):

$$\frac{\sum LF}{N_{norm}},$$

where load factor is the sum of the load factors of the cells in the cluster and $N_{norm}$ is the total normalized number of users in the cluster;

QoS (Quality of Service) in terms of:
Call Block Ratio or Blocking probability,
Packet queuing probability,
Call Drop Ratio.

10. The method of claim 1, comprising:
decreasing "soft handover Overhead" stepwise while monitoring performance indicators indicating soft handover Gain; and
continuing the decreasing of "soft handover Overhead" until the performance indicators do no longer improve, the optimization being then completed.

11. The method of claim 10, wherein the monitored performance indicators are Key performance indicators.

12. A system for improving soft handover Gain comprising:
a determining unit configured to determine the network performance in the uplink or in the downlink, or both in the uplink and in the downlink; and
a measuring unit configured to measure, tune, or measure and tune at least one or more of those parameters, that are directly related to soft handover Gain, so as to control soft handover Gain,
wherein, if the network is coverage limited, the system starts with adjusting soft handover parameters,
wherein the soft handover parameters are 1) soft handover windowAdd, 2) windowDrop, and 3) activeSetSize.

13. The system of claim 12, wherein the determining unit provides an indicator of when and where soft handover Gains are needed.

14. The system of claim 12, wherein, in a coverage-limited environment, higher soft handover Gain is provided in the uplink in order to reduce the uplink outage probability.

15. The system of claim 12, wherein the system is configured, for capacity-limited cases, to increase soft handover Gains in the downlink to reduce congestion probability.

16. The system of claim 12, wherein, the networks are CDMA networks.

17. The system of claim 12, wherein the parameters are system outputs.

18. The system of claim 12, wherein, for determining the network performance, said measuring unit is configured to monitor at least one of one or more of performance indicators, uplink outage probability or NoiseRisePerUser.

19. The system of claim 12, wherein downlink performance is monitored as well, the soft handover Gain is controlled so as to reduce the power of the downlink.

20. The system of claim 12, wherein, for determining the network performance in the uplink or in the downlink, or both in the uplink and in the downlink, at least one or more of the following parameters is measured, tuned or measured and tuned:

Power/normalized user:

$$\frac{\sum \hat{P}txTotal}{N_{norm}},$$

where $\Sigma \hat{P}txTotal$ is the sum of the transmission powers of the base transceiver stations in the cluster and $N_{norm}$ is the total normalized number of users in the cluster: $N_{norm} = N_j \cdot (R_j/R_0 \cdot E_bN_{0,j}/E_bN_0)$, where $N_j$ is the number of users for type j traffic, $R_0$ is the reference bitrate, $R_j$ is the bitrate for type j, $E_bN_0$ is the reference EbNo target and $E_bN_{0,j}$ is the target for type j;

NoiseRise/normalized user:

$$\frac{\sum NR}{N_{norm}},$$

where $\Sigma NR$ is the sum of the noise rises of the cells in the cluster and $N_{norm}$ is the total normalized number of users in the cluster;

load factor/normalized user (for uplink and DL downlink separately):

$$\frac{\sum LF}{N_{norm}},$$

where load factor is the sum of the load factors of the cells in the cluster and $N_{norm}$ is the total normalized number of users in the cluster;

QoS (Quality of Service) in terms of:
Call Block Ratio or Blocking probability,
Packet queuing probability,
Call Drop Ratio.

21. The system of claim 12, comprising a unit for
decreasing "soft handover Overhead" stepwise while monitoring performance indicators indicating soft handover Gain, and
continuing the decreasing of "soft handover Overhead" until the performance indicators do no longer improve, the optimization being then completed.

22. The system of claim 21, wherein the monitored performance indicators are Key performance indicators.

23. The method of claim 1, wherein the soft handover Gain is maximized.

24. The method of claim 1, wherein the method starts with uplink optimization.

25. The method of claim 8, wherein the power of the downlink is reduced by adjusting the soft handover parameters so as to decrease average power per bearer or per user, and a set of parameter setting is set that corresponds to a minimum base station power.

26. The method of claim 9, comprising:
- decreasing "soft handover Overhead" stepwise while monitoring performance indicators indicating soft handover Gain;
- continuing the decreasing of "soft handover Overhead" until the performance indicators do no longer improve, the optimization being then completed.

27. The system of claim 12, wherein the soft handover Gain is maximized.

28. The system of claim 12, wherein the system starts with uplink optimization.

29. The system of claim 19, wherein the power of the downlink is reduced by adjusting the soft handover parameters so as to decrease average power per bearer or per user, and a set of parameter setting is set that corresponds to a minimum base station power.

30. An apparatus, comprising:
- means for determining the network performance in the uplink or in the downlink, or both in the uplink and in the downlink; and
- means for measuring, tuning or measuring and tuning at least one or more of those parameters that are directly related to soft handover Gain, so as to control soft handover Gain,
- wherein, if the network is coverage limited, the apparatus starts with adjusting soft handover parameters,
- wherein the soft handover parameters are 1) soft handover windowAdd, 2) windowDrop, and 3) activeSetSize.

31. An apparatus improving soft handover Gain, comprising:
- determining means for determining the network performance in the uplink or in the downlink, or both in the uplink and in the downlink; and
- measuring means for measuring and tuning at least one or more of those parameters that are directly related to soft handover Gain, so as to control soft handover Gain,
- wherein, for determining the network performance in the uplink or in the downlink, or both in the uplink and in the downlink, at least one or more of the following parameters is measured, tuned or both measured and tuned:

Power/normalized user:

$$\frac{\sum \hat{P}tx Total}{N_{norm}},$$

where $\Sigma \hat{P}txTotal$ is the sum of the transmission powers of the base transceiver stations in the cluster and $N_{norm}$ is the total normalized number of users in the cluster: $N_{norm}=N_j \cdot (R_j/R_0 \cdot E_b N_{0,j}/E_b N_0)$, where $N_j$ is the number of users for type j traffic, $R_0$ is the reference bitrate, $R_j$ is the bitrate for type j, $E_b N_0$ is the reference EbNo target and $E_b N_{0,j}$ is the target for type j;

NoiseRise/normalized user:

$$\frac{\sum NR}{N_{norm}},$$

where $\Sigma NR$ is the sum of the noise rises of the cells in the cluster and $N_{norm}$ is the total normalized number of users in the cluster;

load factor/normalized user (for unlink and downlink separately):

$$\frac{\sum LF}{N_{norm}},$$

where load factor is the sum of the load factors of the cells in the cluster and $N_{norm}$ is the total normalized number of users in the cluster;

QoS (Quality of Service) in terms of:
- Call Block Ratio or Blocking probability,
- Packet queuing probability,
- Call Drop Ratio.

* * * * *